W. WHITE.
COOKING STOVE.
APPLICATION FILED OCT. 5, 1911.

1,079,084.

Patented Nov. 18, 1913.

Witnesses:
W. Weldon
Philip Miller

Inventor:
William White
By —— Atty.

UNITED STATES PATENT OFFICE.

WILLIAM WHITE, OF LONDON, ENGLAND, ASSIGNOR OF ONE-HALF TO FRANK ELLSON BROWN, OF SYDNEY, NEW SOUTH WALES, AUSTRALIA.

COOKING-STOVE.

1,079,084.

Specification of Letters Patent.  Patented Nov. 18, 1913.

Application filed October 5, 1911. Serial No. 652,993.

*To all whom it may concern:*

Be it known that I, WILLIAM WHITE, subject of the King of Great Britain, residing at London, England, have invented certain new and useful Improvements in Cooking-Stoves, of which the following is a specification.

This invention relates to cooking stoves, and more particularly to gas stoves intended for cooking purposes.

In gas cooking stoves as hitherto constructed, a great percentage of the heat from the burnt gas is wasted and the object of the present invention is to produce a stove which can be used simultaneously for grilling, baking and boiling purposes, without necessitating more than one burner or set of burners.

Figure 1:
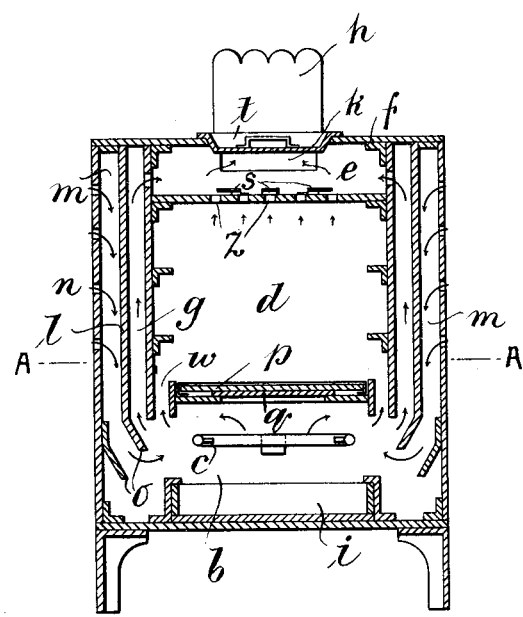
Figure 2:
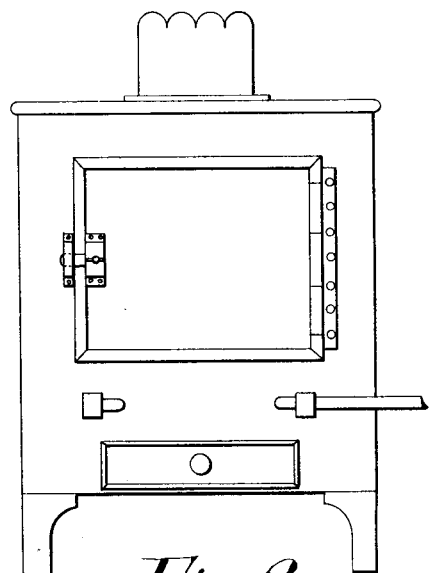
Figure 3:
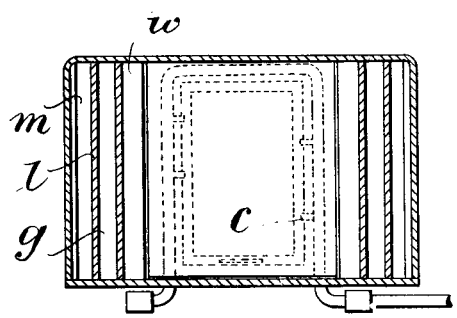
Figure 4:
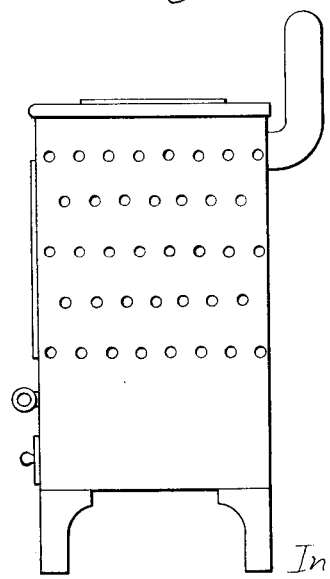

The accompanying drawings illustrate by way of example a stove according to the invention, Figure 1, being a front sectional elevation, Fig. 2, a front elevation, Fig. 3, a sectional plan on A—A Fig. 1. Fig. 4, is a side elevation.

In carrying out the invention, the casing of the stove is divided into preferably three main compartments, a lowermost compartment $b$ which forms a burner chamber, containing a burner or set of burners $c$, and adapted to act as a grilling chamber, an intermediate compartment $d$, adapted to act as an oven and an upper hot chamber $e$, adapted to form a flue to receive saucepans and the like, the top $f$, of this chamber also forming a hot plate. Below the burner or set of burners $c$, in the lower chamber $b$, a grilling drawer $i$, is arranged with the usual facilities for grilling. The hot gases from the burner or set of burners $c$, after striking the deflecting plate forming the bottom of the oven $d$, are led off to one or more side flues $g$, by which they are conducted to the upper chamber $e$, and are utilized to heat saucepans, or other utensils placed in holes in the top $f$, of the upper chamber, or simply placed on said top, which may form a hot plate. The deflecting bottom of the oven is spaced from the sides to leave openings $w$, which form passages for hot gases to the oven. Some of the hot gases are allowed to pass through these side openings $w$, into the oven and thence by perforations $z$, in the top of the oven to the upper hot chamber $e$. The fumes may escape from the upper chamber through a suitable opening $k$, and chimney $h$. The side flues $g$, which act as uptakes to lead hot gases from the lower chamber to the upper are preferably separated by vertical partitions $l$, from down-take inlet ducts $m$, for air which is led to the burner chamber. Air is adapted to enter these ducts or flues $m$, through perforations $n$, in the outer casing of the stove, the air passing down over the heated partitions of the flues and being thereby pre-heated before reaching the burner. The flues are so arranged as to lead in the air to the lower chamber below the level of the burner or burners, for instance, they have deflecting plates $o$, to direct the air to the burners.

As the burner may unduly concentrate its heat upon the deflecting bottom of the oven, it is preferred to cover the bottom with a removable slab $p$, of asbestos, fire brick, metal or other suitable material to moderate the temperature. For convenience in lighting the burner, and for inspection of the same, a large hole is formed in the bottom of the oven, this hole being covered by the cover plate $q$, so that it can be easily uncovered when desired. The top of the oven may be provided with supports $s$, for saucepans or other utensils, inserted through a hole or holes in the top $f$, of the stove. The hole in the top may be closed by a removable cover plate $t$.

Under ordinary conditions it is preferred to close the stove entirely except for the air inlet perforations in the side flues, the chimney being of sufficient length to create the draft required to draw the air into the lower chamber. Any convenient door may be arranged to close the chambers, as for instance in the manner shown where the door is provided for the oven alone.

It will be understood that in the stove constructed as above described, the heat from the one burner, or set of burners, may be utilized to grill food in the lower chamber, roast or bake food in the oven, and boil, or otherwise cook food in utensils inserted in holes in, or simply placed upon, the top plate. A stove of considerably increased efficiency is thereby provided.

I claim:

1. In combination with a burner and burner chamber, a deflector plate over said burner, an oven chamber over said deflecting plate and having its sides spaced therefrom to leave passages for hot gases into said oven chamber, an uptake flue communicating with said burner chamber and located on the side walls of said oven, a cold air down take located outside said uptake flue, the top of said oven being perforated for communication with a hot chamber above the same, said chamber being also arranged to receive the hot gases from said uptake flue and a grilling drawer located in said burner chamber and below said burner.

2. In combination with a burner and burner chamber a deflector plate over said burner, a modulator plate over said deflecting plate, an oven chamber over said deflecting plate and having its sides spaced therefrom to leave passages for hot gases into said oven chamber, an uptake flue communicating with said burner chamber and located on the side walls of said oven, a cold air downtake located outside said uptake flue, the top of said oven being perforated for communication with a hot chamber above the same, said chamber being also arranged to receive the hot gases from said uptake flue, and a grilling drawer located in said burner chamber and below said burner.

In testimony whereof I have signed my name to this specification in the presence of two subscribing witnesses.

WILLIAM WHITE.

Witnesses:
JOHN EAKINS,
BERTRAM CLARK.

---

Copies of this patent may be obtained for five cents each, by addressing the "Commissioner of Patents, Washington, D. C."